United States Patent [19]
Schule

[11] Patent Number: 4,778,319
[45] Date of Patent: Oct. 18, 1988

[54] SELF-TAPPING SCREW

[76] Inventor: Siegfried Schule, Schwalbenstrasse 9, 6078 Neu-Isenburg 2, Fed. Rep. of Germany

[21] Appl. No.: 21,277

[22] Filed: Mar. 3, 1987

[30] Foreign Application Priority Data

Mar. 6, 1986 [DE] Fed. Rep. of Germany ....... 3607417

[51] Int. Cl.$^4$ ............................................. F16B 25/00
[52] U.S. Cl. ..................................... 411/387; 411/412
[58] Field of Search ............... 411/383, 386, 387, 412, 411/413, 352, 353, 965, 999

[56] References Cited

U.S. PATENT DOCUMENTS

| | | | |
|---|---|---|---|
| 2,929,474 | 3/1960 | Boardman | 411/412 |
| 3,195,600 | 7/1965 | Middleton, Jr. | 411/353 |
| 3,426,321 | 2/1969 | Peterson, Jr. | 411/413 |
| 3,682,507 | 8/1972 | Wand | 411/413 |
| 4,453,361 | 6/1984 | Hulsey | 411/386 |

FOREIGN PATENT DOCUMENTS 2126914 7/1978 Fed. Rep. of Germany .
8125414 12/1981 Fed. Rep. of Germany .

Primary Examiner—Neill R. Wilson

[57] ABSTRACT

A self-tapping screw (1) for use in fixing insulating boards (4) and waterproof sheeting (3, 3'), to a flat roof sheet panel (2), has a screw head (6), a self-drilling tip (10) and a screw shank which has a self-tapping thread (9) adjoining the self-drilling tip (10) and divided into sections (9/2, 9/3) by at least one smooth shank section (8). A further smooth shank section (7) directly adjoins the screw head (6). The diameter of the smooth shank sections (7, 8) is smaller than the root diameter of the self-tapping thread (9), and the end (15) of each thread section nearest the screw head (6), extends radially inwardly to the screw-shank diameter in the form of a flat radial surface (16) which is free of a thread run-out and is perpendicular to the axis of the screw shank. The screw (1) provides greater reliability against being unintentionally slackened, released and pulled out of its anchorage hole under the typical stresses experienced by flat roofs.

6 Claims, 1 Drawing Sheet

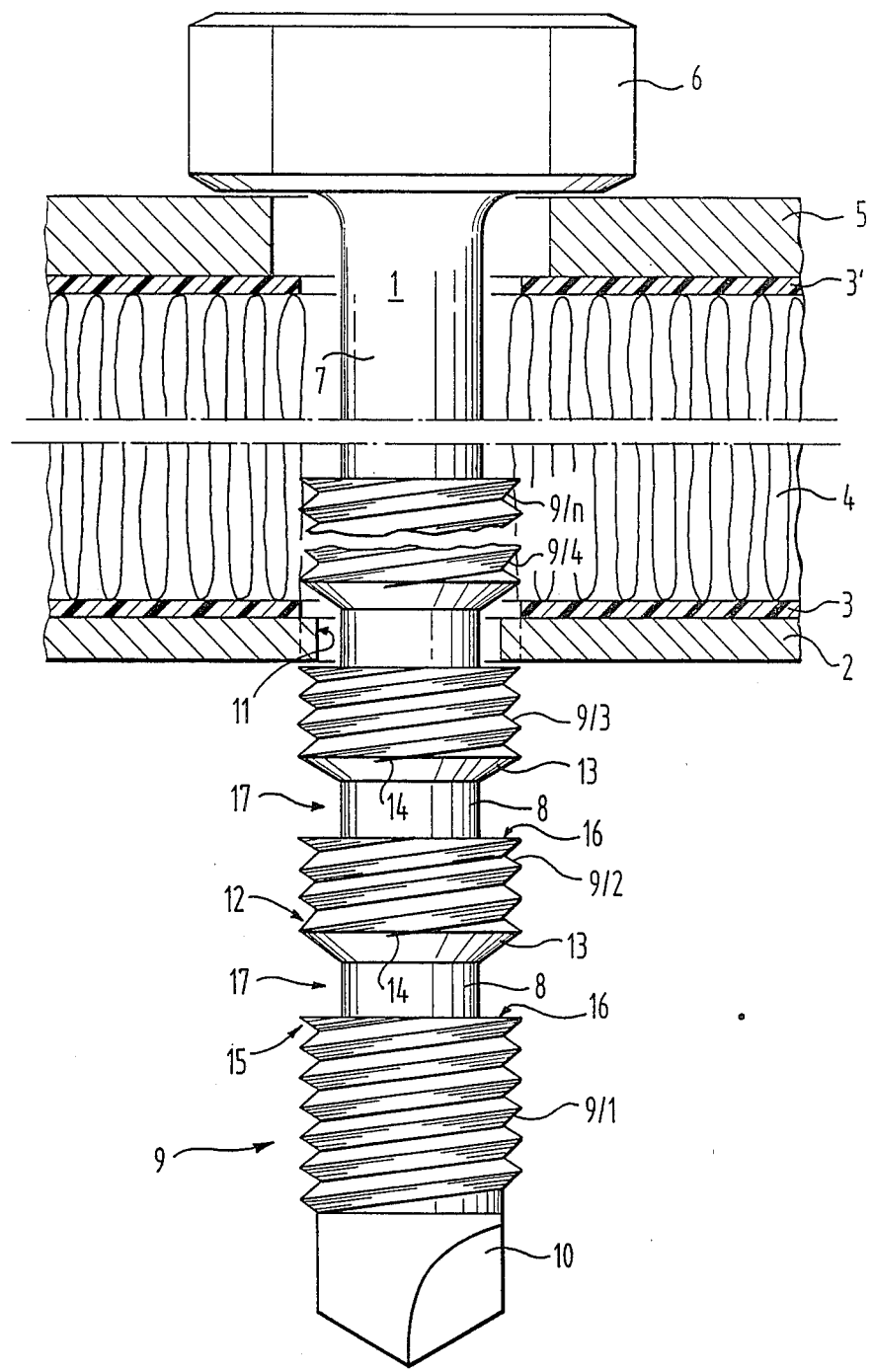

SELF-TAPPING SCREW

BACKGROUND OF THE INVENTION

This invention relates to a self-tapping screw for use in fixing insulating boards and waterproof sheeting, if such is required to be fixed with the insulating boards, to a roofing panel, especially to a sheet panel forming a coverplate for a flat roof. In particular the present invention concerns a self-tapping screw having a head, a self-drilling tip and a shank connecting the head to the tip and including a self-tapping threaded section adjoining the self-drilling tip, and at least one smooth shank section located between two threaded sections.

A self-tapping screw of the above mentioned form is disclosed in the German Auslegeschrift No. 2,126,914. In the known screw, a first threaded section directly adjoins the screw head and is followed by a first smooth shank section. All transitions between the threaded sections and the smooth shank sections are made as a normal thread run-in or thread run-out. The known screw has three different threaded sections, each of which has a different outside diameter. The threaded section adjacent to the screw head has the largest outside diameter and the thread section furthest away from the screw head has the smallest diameter. With this design, there is a risk that the continually changing wind-pressure and suction forces which act on the insulating board and possibly the waterproof sheeting(s) of a flat roof covering, will loosen the seating of the screw, turn back the screw, and finally pull the screw completely out of a drilled hole, because in the drilled hole the threaded sections having a smaller outside diameter provide lower retaining forces.

SUMMARY OF THE INVENTION

The present invention has for its main object to provide a self-tapping screw of greater reliability against the screw being unintentionally slackened, released and pulled out of its anchorage hole.

A further object of the invention, is to provide a screw suitable for use with various flat roof coverings having a different thickness in the layer of insulating board and possibly waterproof sheeting.

The present invention provides a self-tapping screw having a screw head, a self-drilling tip and a screw shank which has a self-tapping thread adjoining the self-drilling tip. A first smooth shank section directly adjoins the screw head. Moreover, there is at least one second, smooth thread section adjoined on both sides by threaded sections. The diameter of the smooth shank sections is smaller than the root diameter of the self-tapping thread. The end of the threaded section on the second (and if necessary further) shank section(s), which end faces towards the screw head, recedes down to the screw-shank diameter in the form of a flat radial surface which is free of a thread run-out and is vertical to the axis of the screw shank.

The self-drilling tip is used for predrilling a core hole. The diameter of the self-drilling tip is adapted to the self-tapping thread so that the latter cuts the thread turns into the predrilled core hole. The diameter of the smooth, thread-free shank sections of the screw according to the invention is much smaller than the root diameter of the self-tapping thread. the diameter of the smooth screw shank is preferably only about 60 to 80%, and preferably about 70%, of the root diameter of the self-tapping thread. At the finished attachment, these sections of smaller shank diameter create annular hollow spaces into which the sheet material of a sheet panel or the like can project. A self-drilling tip is preferably used which to a certain extent flanges the edge area in the drilled section of the sheet panel or the like when the core hole is being drilled. Such a flanged portion can elastically engage into the formed hollow space and bear directly against the smooth, thread-free shank section.

In addition, the transition from the smooth, thread-free shank section of reduced diameter to the adjacent threaded section is formed by a flat radial surface which is perpendicular to the axis of the screw shank and has no thread run-out. In other words, the end of the threaded section on the second, smooth shank section (and if necessary on the further smooth shank sections), which end faces towards the screw head, recedes down to the screw-shank diameter in the form of a flat radial surface which is free of a thread run-out and is perpendicular to the axis of the screw shank. Once an attachment has been completed with such screws, the formed drilled section of the sheet panel projects into this annular space and essentially bears against a smooth screw shank, with the edge area of this drilled section being supported on the flat radial surface of this thread-section end which is free of a thread run-out. In this installed position, this flat radial surface prevents the adjacent thread section from being inserted again into the precut thread turns on the sheet panel, thus preventing the screw from being turned back unintentionally.

The screw according to the invention is preferably used for fixing insulating boards and waterproof sheeting, to be fixed if necessary together with the insulating boards, to a sheet panel forming a cover plate for a flat roof. The material of the insulating boards and also possible waterproof sheeting(s) is substantially softer and more flexible than the metal of the sheet panel. The action of the dynamic, continually changing wind-pressure and suction forces on the large insulating board and possible waterproof sheeting(s) leads to slight deformations and/or positional changes in the material of the insulating board and possible waterproof sheeting(s) which the screw attempts to follow. In this case, the screw strays from its original centered position with respect to the internal thread cut into a tight sheet panel provided the corresponding section of the sheet panel is located adjacent to a smooth, thread-free shank section. The resulting eccentric arrangement of the drilled hole in the sheet panel and the axis of the screw shank leads to the flat radial surface on the adjacent end of a thread section and aligned vertically to the shank axis at least partly undercutting the drilled-hole edge section of the sheet panel and successfully prevents the screw from being turned back and finally pulled out.

With the aid of a setting tool, the screw according to the invention can easily be passed through both the insulating board to be fixed and possible waterproof sheeting as well as through the sheet panel, supporting the latter, on the cover plate of a flat roof. The sheet panel can be a flat or profiled sheet. In addition to the sheet panel, the cover plate can alternatively have insulated or non-insulated cover panels. Owing to the self-drilling tip and the self-tapping thread directly adjoining it, the screw can be turned into the internal thread cut into the sheet panel despite the presence of the smooth shank sections of reduced diameter. The start of each screw thread adjacent to a smooth shank section, which starts face towards the screw head, are preferably made in the form of a truncated-cone surface which is provided with a thread run-in. The slope of the truncated-cone surface can be adapted to the flanks of the self-tapping thread so that the screw is centered again when it is turned in. This further reduces any weakening in the material in the edge area of the drilled-hole section on the sheet panel, which in turn increases the resistance against the screw being pulled out.

A smooth, thread-free section of the screw shank directly adjoins the screw head. The transition of this smooth shank section to the adjacent threaded-section end facing towards the screw head is also preferably made in the form of a flat radial surface which is free of a thread run-out and is perpendicular to the axis of the screw shank. In this case, all thread-section ends which are to point towards the screw head end in the form of a flat radial surface which extends radially down to the screw-shank diameter and which, after the screw and drilled hole in the sheet panel have soon formed an eccentric arrangement, relative to one another, forms a support for the screw against the sheet panel which effectively prevents the screw from being unintentionally turned back and/or being turned out.

With the screw according to the present invention, a fixing member is thus created with which insulating boards and waterproof sheeting to be fixed if necessary together with the insulating boards, and also of varying thickness, can be reliably fixed to a sheet panel forming a cover plate for a flat roof. The invention is described below in more detail with reference to a preferred embodiment shown in the Drawing.

DETAILED DESCRIPTION OF THE PREFERRED EMBODIMENT

The self-drilling and self-tapping screw, designated generally as 1 in the Drawing, is used for fixing insulating boards and waterproof sheeting, to be fixed if necessary together with the insulating boards, to the sheet panel of a cover plate of a flat roof. The cover plate of the flat roof (not shown) has a sheet panel consisting of flat or profiled sheets; in addition to these sheets, the cover plate 2 can have insulated or non-insulated cover panels. In the application shown, the cover plate 2 consists of sheet panels, on the upper side of which is arranged waterproof sheeting 3, which serves as a vapor barrier, and arranged above the waterproof sheeting 3 is an insulating board 4. Further waterproof sheeting 3' which prevents the penetration of moisture is located on the upper side of the insulating boards.

The screw 1 has a screw head 6 which can be positively located in a screw-setting tool. A fixing means 5 is inserted between the screw head 6 and the uppermost layer of the thermal insulating boards 4 and the waterproof sheeting 3 and 3' provided at least in the exemplary embodiment described, which fixing means 5 distributes the contact pressure originating from the screw head 6 over a larger surface area. A plate-shaped or disc-shaped fixing means 5 is preferably provided, for example in the form of a packing washer.

Projecting from the screw head 6 of the screw 1 is a screw shank which passes through the fixing means 5 and the waterproof sheeting 3 and 3'. This screw shank, with the first smooth shank section 7 directly adjoining the screw head 6 and the second and further smooth shank sections 8, ends in a self-drilling tip 10 with which the core hole 11 for the internal thread to be cut can be drilled in the sheet panel of the cover plate 2 of the flat roof. The screw shank has a self-tapping thread 9 which is divided into individual threaded sections 9/1, 9/2, 9/3, 9/5, 9/n arranged at a distance from one another. The self-drilling tip 10 merges directly into a first threaded section 9/1. At the thread section start 12, which faces away from the screw head 6, that is, it has to point towards the self-drilling tip 10, the following threaded sections 9/2 to 9/n have a truncated-cone surface 13 which begins at a shank section 8 and extends up to the first thread turn. As indicated schematically, the truncated-cone surface 13 is provided with a thread run-in 14 so that the individual threaded sections 9/2 and 9/3 can turn into the predrilled core hole 11 in the sheet panel 2. The end 15 of each threaded section 9/1 to 9/n, which end 15 faces towards the screw head 6, recedes down to the smooth screw shank 8 in the form of a flat radial surface 16 perpendicular to the screw axis. No thread run-in or run-out is formed on this radial surface 16.

Thus a radial groove 17 is formed between adjacent thread sections 9/1 and 9/2 or 9/2 and 9/3 or 9/3 and 9/4, the flanks of which radial groove 17 are formed on the one hand by the radial surface 16 of the thread section adjacent to the self-drilling tip 10 and on the other hand by the truncated-cone surface 13 of the next thread section. The smooth, cylindrical peripheral surface of the screw shank 8 serves as the root of each radial groove 17. Within the scope of this specification, such screw-shank sections, each defined by two adjacent threaded sections, are described as "second" or further screw-shank sections 8.

A further "first" screw-shank section 7, directly adjoining the screw head 6, extends down to the adjacent thread section 9/n. The first screw-shank section 7 and the second screw-shank sections 8 have a diameter which is much smaller than the root diameter of the self-tapping thread 9. The first screw-shank section 7 and the second screw-shank sections 8 preferably have the same diameter. In a practical embodiment, the self-tapping thread has a root diameter of about 4.7 mm and, in contrast, the diameter of the screw-shank sections 7 and 8 is only about 3.5 mm.

The screw can be manufactured by using as a blank a screw with a continuous self-tapping thread, and by turning this thread down to the required extent in the area of the first and second screw-shank sections 7 and 8.

The task of the second smooth screw-shank sections 8 is to enable the screws 1 to be arranged eccentrically inside the drilled core holes passing through the cover plate 2. Consequently, the width of the radial grooves 17 or the length of the second smooth screw-shank sections 8 corresponds at least to the thickness of typical sheet panels 2 on a flat roof. The width of these radial grooves 17 is preferably slightly larger, about up to 1 mm, than the thickness of the sheet panel 2. In this way, dimensional discrepancies in the thickness of the sheet panel 2 can be compensated, and on the other hand slightly lifting movements of the screw 1 are possible under the effect of the pressure and suction forces present on the roof side, which reduces the load on the screw inside its drilled anchorage.

The preferred provision of a number of radial grooves 17 or second shank sections 8 distributed over the length of the shank ensures that a radial groove 17 is always located adjacent to the sheet panel 2 when the screw head 6 essentially bears against the fixing means 5, even when the pile consisting of the insulation 4, possible waterproof sheeting 3 and 3' and also possible cover panels is of varying thickness. The individual thread sections 9/2, 9/3, 9/4 and 9/n preferably have an axial length of a few millimeters for example of about 2 to 6 mm. In contrast, the thread section 9/1 directly adjoining a drilling tip can be longer in order to facilitate the cutting of an internal thread in the drilled core hole.

Irrespective of the thickness of the insulating board 4, to be fixed in each case, possible waterproof sheeting 3 and 3' and the plate-shaped or disc-shaped fixing means 5, the screw 1, when it is being set, is first of all guided by means of an appropriately designed screw-setting tool through the insulation 4 and possible waterproof sheeting 3 and 3' in order to subsequently predrill the core hole in the sheet panel 2 with the self-drilling tip 10. The thread section 9/1 of the self-tapping thread 9 will then cut an internal thread section into the sheet panel 2 around the core hole 11. After that, the screw 1 is turned in until the first thread section 9/1 disengages from the internal thread on the sheet panel 2. As a result, the sheet panel 2 is located in the first radial groove 17, adjacent to the self-drilling tip 10, between the flat, radial surface 16 and the truncated-cone surface 13. The fixing operation is complete provided this arrangement of the fixing screw 1 is adequate for reliable fastening at the existing overall wall thickness of the insulating board and possible waterproof sheeting. However, if the screw head 6, in this arrangement, is still at a substantial distance from the disc-shaped, or plate-shaped fixing element 5, that is, if the screw 1 has not yet been turned in far enough, the screwing-in operation is continued. In this operation, the screw 1, which is now turned slower than before, is centered in the core hold 11 with the truncated-cone surface 13 on the thread section 9/2 and searches for the thread turn in the core hole. After a thread turn is engaged by the thread run-in 14 on the truncated-cone surface 13 and after the screw is centered, the next thread section 9/2 is turned through the internal thread on the sheet panel 2 without the edge section at the drilled hole in the sheet panel 2 sustaining any considerable damage. This operation is repeated until the screw head 6 essentially bears against the upper side of the fixing element 5. Owing to the compressibility of the insulation 4 and the comparatively small axial length of the individual thread sections 9/2, 9/3 etc., an arrangement can always be realized in which a screw head 6 secures the thermal insulation 4 and possible waterproof sheeting 3 and 3' against the cover plate 2 via the fixing means 5, and the drilled hole 11 in the sheet panel 2 is arranged adjacent to a radial groove 17 and projects at least slightly into the latter.

The screw 1, possibly galvanized and preferably made of iron or solid steel, and a sheet panel 2 are the stiffest or most rigid components of the roof cover considered here. The radial groove 17 permits the screw 1 to have a certain amount of clearance relative to the essentially tight sheet panel 2. The thermal stresses and also the constant, continually varying wind forces will soon give rise to an eccentric arrangement of the smooth screw-shank sections 7 or 8 inside the drilled core hole 11 in the sheet panel 2, so that part of the radial surface 16 at the adjacent end 15 of the thread section grips behind the underside of the sheet panel 2, is supported there and prevents the screw 1 from turning back or being pulled out again. Subsequent removal of the screw 1 thus locked would only be possible by the drilled section of the sheet panel 2 being destroyed around the core hole 11; but this requires a considerable force expenditure which clearly exceeds the normal force actions and which finally leads to the screw being pulled out. From experience, this considerable force expenditure is substantially greater than those forces which, as a result of the wind, can become active, even at the highest wind velocities, at the insulating boards 4 fixed according to the invention and the waterproof sheeting 3 and 3' to be fixed if necessary together with the insulating boards 4.

What is claimed is:

1. A self-tapping screw for use in fixing insulating boards and waterproof sheeting to a roofing panel, said screw comprising:

a head, a self-drilling tip and a shank interconnecting said tip and said head,
   said shank including plurality of self-tapping threaded sections, said threaded sections alternating with plurality of smooth shank sections, one of said threaded sections being positioned directly adjacent said tip, and one of said smooth shank sections being positioned directly adjacent said head,
   said smooth shank sections having diameter smaller than the root diameter of said threaded sections, each of said threaded sections including a flat shoulder formed at an end facing said head, said shoulder extending radially inwardly to adjacent smooth shank section perpendicular to the axis of the screw shank, and said flat shoulder being free of a thread run-out.

2. A screw according to claim 1, wherein said smooth shank sections have diameter in the range of about 60 to 80% of the root diameter of said threaded sections.

3. A screw according to claim 1 wherein each threaded section located between said smooth shank sections has a start portion at the end thereof remote from the head, said start portion being in the form of a truncated-cone surface having a thread run-in.

4. A self-tapping screw for use in fixing to a roofing panel insulating boards and waterproof sheeting if required to be fixed with the insulating boards, comprising:

a head, a self-drilling tip and a shank interconnecting said shank having a self-tapping thread adjoining the tip, a plurality of threaded sections and at least one smooth shank directly adjoining the screw head, said smooth shank sections having smaller diameter than the root diameter of said self-tapping thread, each threaded section located between smooth shank sections having a start portion at the first end thereof remote from the head, said start portion being in the form of a truncated-cone surface having a thread run-in, and each threaded section having a second end portion at the opposite end thereof, said second end portion being in the form of a flat shoulder extending radially inwardly to the adjoining smooth shank section, said end portion being free of a thread run-out, and perpendicular to the axis of the said screw shank.

5. A screw according to claim 4, wherein said smooth shank sections have a diameter in the range of about 60 to 80% of the root diameter of said self-tapping thread.

6. A screw according to claim 5, wherein said shank comprises plurality of smooth shank sections each located between two threaded sections, and said threaded sections have an axial length in a range at about 2 to 6 mm.

* * * * *